US010557590B1

(12) United States Patent
Brassard

(10) Patent No.: US 10,557,590 B1
(45) Date of Patent: Feb. 11, 2020

(54) CLAMP-TYPE MOUNT CAPABLE OF BEING CLAMPED TO OBJECTS OF A WIDE RANGE OF SIZES

(71) Applicant: ARKON RESOURCES, INC., Arcadia, CA (US)

(72) Inventor: Paul Brassard, Arcadia, CA (US)

(73) Assignee: ARKON RESOURCES, INC., Arcadia, CA (US)

(*) Notice: Subject to any disclaimer, the term of this patent is extended or adjusted under 35 U.S.C. 154(b) by 0 days.

(21) Appl. No.: 16/200,721

(22) Filed: Nov. 27, 2018

(30) Foreign Application Priority Data

Sep. 13, 2018 (TW) .............................. 107132303 A

(51) Int. Cl.
| F16M 13/00 | (2006.01) |
| F16M 13/02 | (2006.01) |
| F16B 2/10 | (2006.01) |
| F16B 2/00 | (2006.01) |
| F16C 11/06 | (2006.01) |

(52) U.S. Cl.
CPC ........... *F16M 13/022* (2013.01); *F16B 2/005* (2013.01); *F16B 2/10* (2013.01); *F16C 11/06* (2013.01); *F16M 2200/06* (2013.01)

(58) Field of Classification Search
CPC ......... H05K 5/0204; F16M 11/14; F16B 2/12; F16B 2/02; F16B 2/065; F16B 2/10
See application file for complete search history.

(56) References Cited

U.S. PATENT DOCUMENTS

| 8,085,481 | B2 * | 12/2011 | Hill | .......................... | G03B 3/00 |
| | | | | | 248/229.24 |
| 9,273,821 | B2 * | 3/2016 | Chang | ..................... | F16M 13/00 |
| D800,207 | S  * | 10/2017 | Harrison | ...................... | D16/245 |
| 2014/0110544 | A1 * | 4/2014 | Chang | .................. | F16M 11/041 |
| | | | | | 248/207 |
| 2015/0108306 | A1 * | 4/2015 | Chuang | .................. | F16M 11/14 |
| | | | | | 248/231.51 |
| 2015/0267863 | A1 * | 9/2015 | Chang | ...................... | A45B 3/00 |
| | | | | | 248/333 |
| 2018/0187704 | A1 * | 7/2018 | Chang | ..................... | F16B 2/065 |

* cited by examiner

*Primary Examiner* — Steven M Marsh
(74) *Attorney, Agent, or Firm* — Bacon & Thomas, PLLC

(57) ABSTRACT

A clamp-type mount capable of being clamped to objects of a wide range of sizes includes: first and second clamping members; a clamping-member pivot shaft pivotally provided in the clamping members so that the clamping members can enter a clamping state and a releasing state; a tightening pivot shaft pivotally connected to the second clamping member; a tightening threaded rod with a first end penetrating the first clamping member and an opposite second end fixedly connected to the tightening pivot shaft; a tightening knob threadedly connected to the first end of the tightening threaded rod so as to be displaced along the tightening threaded rod when rotated and thereby force the second clamping member toward the first clamping member; and a spherical coupling head fixedly provided on the first clamping member to couple with an adapter, through which a supporting base can be linked to the spherical coupling head.

5 Claims, 9 Drawing Sheets

CLAMP-TYPE MOUNT CAPABLE OF BEING CLAMPED TO OBJECTS OF A WIDE RANGE OF SIZES

FIELD OF THE INVENTION

The present invention relates to a clamp-type mount capable of being clamped to objects of a wide range of sizes, More particularly, the invention relates to a mount with a rotatably adjustable clamping base, wherein the clamping base has a spherical coupling head securely connectable to plate-shaped objects of different orientations (e.g., horizontal or vertical ones), and wherein the mount can be fixed to such a plate-shaped object (e.g., a mobile electronic device) through the spherical coupling head at an angle that makes it easier to operate, and/or view the contents displayed by, the mobile electronic device, thereby featuring enhanced convenience in installation and use.

BACKGROUND OF THE INVENTION

Thanks to the continual rapid advancement of high-tech industries in the past two to three decades, technologies associated with microcomputers, wireless communication, and mobile broadband Internet access have reached higher and higher levels of maturity. This development trend has not only brought down the production costs of various mobile electronic devices, but also led to lighter and thinner designs. The market, therefore, has been supplied with a plethora of mobile electronic devices that have Internet access and multimedia functions, some notable examples of which are smartphones, personal digital assistants (PDAs), tablet PCs, and e-book readers. These mobile electronic devices are more portable than PCs and have a great variety of functions. In addition to taking pictures, making video calls, and playing music, the aforesaid devices may even be able to do word processing, to send and receive emails, to download and play streaming media, and to support the global positioning system (GPS), the objective being to satisfy all sorts of user needs. In fact, mobile electronic devices have become indispensable tools at work as well as in our daily lives, and are used so extensively that almost everyone has one of those devices.

Generally speaking, one who is using a mobile electronic device would hold the housing of the device with one hand and operate the touchscreen of the device with the other hand. If the user keeps using the device for an extended period of time, the action of supporting the device single-handedly, plus the weight of the device itself, tends to fatigue the user's affected elbow and wrist. In consideration of this, different types of mobile electronic device mounts have been developed. For example, some mounts are designed to be secured in the interior of a car and support a mobile electronic device so that a user can drive safely with both hands and, whenever necessary during driving, view the contents displayed by, and/or operate, a mobile electronic device (in particular to receive and make phone calls, consult a map, or use the navigation function) in a steady manner. Once securely positioned on the mount, the mobile electronic device can be used with greater ease than when held in the user's hand.

FIG. 1 shows a conventional clamping and hanging mount 1, which is the most common type, and of the simplest form, on the market. The conventional clamping and hanging mount 1 is integrally formed of fiber-reinforced plastic and includes a spherical connecting head 11, at least one supporting portion 13, and at least one clamping portion 15. The spherical connecting head 11 is protrudingly provided at the front end of the conventional clamping and hanging mount 1 and matches a supporting base 25 in configuration so as to connect with the supporting base 25 and support a mobile electronic device (not shown) through the supporting base 25. The connecting structures between the supporting base 25 and the spherical connecting head 11 allow the mobile electronic device to be adjusted positionally and angularly with respect to the spherical connecting head 11. Generally, with continued reference to FIG. 1, the supporting base 25 includes a tightening ring 251 and a positioning plate 253. The inner periphery of the tightening ring 251 is provided with an internal thread 2511. The front end of the positioning plate 253 is configured to support a mobile electronic device (not shown). The rear end of the positioning plate 253 is provided with a plurality of tightening plates 2533, which are annularly arranged at an interval such that a clamping space 2535 is formed between and surrounded by the inner sides of the tightening plates 2533. The clamping space 2535 matches the spherical connecting head 11 in configuration so that the spherical connecting head 11 can be received in the clamping space 2535, with the inner sides of the tightening plates 2533 lying against the periphery of the spherical connecting head 11. The outer sides of the tightening plates 2533 are formed with an external thread (not shown) adjacent to the free ends of the tightening plates 2533. The external thread matches the internal thread 2511. Once the tightening plates 2533 are passed through the tightening ring 251 and the spherical connecting head 11 is positioned in the clamping space 2535, the tightening ring 251 can be rotated to bring the external thread and the internal thread 2511 into engagement, or threaded connection, in order for the inner periphery of the tightening ring 251 to press on the outer sides of the tightening plates 2533, and for the inner sides of the tightening plates 2533 to press tightly against the periphery of the spherical connecting head 11, thereby joining the supporting base 25 securely to the conventional clamping and hanging mount 1. Conversely, the relative positions of, and the angle between, the supporting base 25 and the conventional clamping and hanging mount 1 can be adjusted by loosening the tightening ring 251. The supporting portion 13 is fixedly provided at the rear end of the conventional clamping and hanging mount 1 and is adjacent to the lower edge of the conventional clamping and hanging mount 1. The clamping portion 15 is also fixedly provided at the rear end of the conventional clamping and hanging mount 1 but is adjacent to the upper edge of the conventional clamping and hanging mount 1. The clamping portion 15 has a rearwardly extending free end that forms a connecting head 151, and the connecting head 151 has two vertically corresponding hook portions. The connecting head 151 can be clamped to a deflecting vane 19 at an air conditioner outlet 17 in the interior of a car so that the conventional clamping and hanging mount 1 is securely positioned at and hung on the deflecting vane 19, with the supporting portion 13 distributing the weight of the conventional clamping and hanging mount 1 and of the supported mobile electronic device to the frame and adjacent deflecting vanes 19 of the air conditioner outlet 17, lest an abrupt increase in the force and torque generated by the combined weight of the conventional clamping and hanging mount 1 and the mobile electronic device (e.g., caused by collision with, or a large force applied to, the mount or the device) damage the structure of the deflecting vane 19 bearing the force and torque.

Apart from the conventional clamping and hanging mount 1 described above, the market is supplied with conventional mounts that are designed to be installed via suction or adhesive attachment. These conventional suction- or adhesive-based mounts typically have a highly effective suction cup or double-sided adhesive tape on the bottom or rear side in order to secure the bottom or rear side to a flat surface in the interior of a car (e.g., the dashboard or the inner side of the windshield) either by suction or adhesively. A mobile electronic device user, therefore, only has to position the mobile electronic device on the front side of the conventional clamping and hanging mount 1 or on the front or top side of a conventional suction- or adhesive-based mount, and the mobile electronic device can be used and operated without the user holding the device manually and persistently. While the conventional mounts are indeed capable of supporting various mobile electronic devices securely and thereby freeing a device user's hands from the onerous task of providing physical support for the device being used, the following inconveniences still arise from use of the conventional mounts:

(1-1) Inconvenient detachment: Referring back to FIG. 1, the clamping portion 15 of the conventional clamping and hanging mount 1 is in most cases integrally formed of fiber-reinforced plastic. To reduce the weight and volume of the conventional clamping and hanging mount 1, however, the clamping portion 15 generally has a small thickness. In order for the clamping portion 15 to have a firm grip on the deflecting vane 19, it is common practice to provide the rearwardly extending free end (i.e., the connecting head 151) of the clamping portion 15 with two vertically corresponding hook portions, whose vertically openable structures can compensate for the relatively low structural strength and insufficient clamping force of the clamping portion 15. Once the conventional clamping and hanging mount 1 is clamped to, positioned at, and hung on the deflecting vane 19 through the connecting head 151, the hook portions at the free end (i.e., the connecting head 151) of the clamping portion 15 are vertically engaged with each other in back of the deflecting vane 19; as a result, one who desires to detach the conventional clamping and hanging mount 1 from the deflecting vane 19 often finds it difficult, if not impossible, to separate the hook portions from each other, let alone from the deflecting vane 19. In other words, detaching the conventional clamping and hanging mount 1 from the deflecting vane 19 tends to cause substantial inconvenience to the user.

(1-2) Limitation on the installation location and hence on application: As the conventional clamping and hanging mount 1 must be clamped to the deflecting vane 19 at the air conditioner outlet 17 in the interior of a car through the hook portions at the free end (i.e., the connecting head 151) of the clamping portion 15, and a conventional suction- or adhesive-based mount must have its bottom or rear side securely attached to a flat surface in the interior of a car via a suction cup or double-sided adhesive tape, it is impossible to apply the conventional clamping and hanging mount 1 to a vehicle without the air conditioner outlet 17 (e.g., a motorcycle or bicycle) or apply a conventional suction- or adhesive-based mount to a space that lacks a suitable flat surface (e.g., the cargo compartment of a truck or a ship cabin).

(1-3) Difficult adjustment: As stated above, the conventional clamping and hanging mount 1 is configured to be clamped to the deflecting vane 19 at the air conditioner outlet 17 in the interior of a car through the hook portions at the free end (i.e., the connecting head 151) of the clamping portion 15, and a conventional suction- or adhesive-based mount is configured to have its bottom or rear side securely attached to a flat surface in the interior of a car via a suction cup or double-sided adhesive tape. Once the conventional clamping and hanging mount 1 or a conventional suction- or adhesive-based mount is properly installed, therefore, only the connecting structures between the spherical connecting head 11 and the supporting base 25 allow positional and angular adjustment of the mobile electronic device supported on the supporting base 25; no other mechanism is provided in either mount for positional or angular adjustment, which, in turn, imposes strict limits on the range in which the connecting structures between the spherical connecting head 11 and the supporting base 25 allow the position and angle of the supported mobile electronic device to be adjusted. In short, it is difficult for a user of the conventional clamping and hanging mount 1 or of a conventional suction- or adhesive-based mount to adjust the supported mobile electronic device arbitrarily to a proper position or angle as needed.

In view of the above, RAM MOUNTS of USA developed a clamp-type mount named "TOUCH CLAW" as shown in FIG. 2. This conventional clamp-type mount 2 includes a first clamping member 20, a second clamping member 21, a clamping-member pivot shaft 22, a tightening pivot shaft 23, a tightening threaded rod 24, a tightening knob 27, and a spherical coupling head 26. Each of the first clamping member 20, the second clamping member 21, and the spherical coupling head 26 is integrally formed of fiber-reinforced plastic by injection molding. The first clamping member 20 and the second clamping member 21 are pivotally connected via the clamping-member pivot shaft 22 at a position adjacent to one end (hereinafter the first end) of each clamping member and can therefore be rotated about the clamping-member pivot shaft 22 to bring the free ends (i.e., the other ends, hereinafter the second ends) of the first and the second clamping members 20, 21 either close to each other into a "clamping state" or away from each other into a "releasing state". The corresponding inner sides of the first and the second clamping members 20, 21 are concavely provided with curved clamping grooves 200, 210 respectively. In the "clamping state", the free ends of the first and the second clamping members 20, 21 or the surfaces of the clamping grooves 200, 210 of the first and the second clamping members 20, 21 are in contact with or close to each other so as to clamp a fixing member (e.g., a fixing rod, a fixing plate, or a fixed projection or edge) between them and thereby position the conventional clamp-type mount 2 on the fixing member.

With continued reference to FIG. 2, an anti-slip element 201, 211, which is a layer of elastic plastic material, is adhesively bonded to the surface of each of the clamping grooves 200, 210 to enhance the clamping ability of the clamping members 20, 21, lest the clamping members 20, 21 slide on the fixing member or conic off the fixing member. The tightening pivot shaft 23 is transversely and pivotally connected to the second clamping member 21 at a position adjacent to a middle section of the second clamping member 21. A tightening threaded hole 230 is formed in a middle section, and along a diameter, of the tightening pivot shaft 23 and thus penetrates the tightening pivot shaft 23. One end (hereinafter the first end) of the tightening threaded rod 24 extends through the first clamping member 20 and is exposed on the outer side of the first clamping member 20. The other end (hereinafter the second end) of the tightening threaded rod 24 is threadedly connected to the tightening threaded hole 230. The tightening knob 27 is fixed at the first end of the tightening threaded rod 24 so that the tightening threaded rod 24 can rotate along with the tightening knob 27 to displace the second end of the tightening threaded rod 24 through the tightening pivot shaft 23 along an axial direction of the tightening threaded hole 230 until exposed on the outer side of the second clamping member 21, thereby applying a tightening force to the tightening pivot shaft 23 that brings the second clamping member 21 toward the first clamping member 20. Once the free ends of the first and the second clamping members 20, 21 (or the surfaces of the clamping grooves 200, 210) clamp the fixing member tightly between them, the conventional clamp-type mount 2 is securely positioned on the fixing member. The foregoing configuration allows the conventional clamp-type mount 2 to be easily and firmly positioned on all kinds of fixing members, such as the handlebars of a motorcycle or bicycle, the handrails in a cargo compartment or ship cabin, and the edge of a work platform.

Referring to FIG. 3 and FIG. 4, a supporting base 4 can be subsequently linked to the spherical coupling head 26 (which is fixedly provided on the outer side of the first clamping member 20 at a position adjacent to the first end of the first clamping member 20) via an adapter 3 so that a mobile electronic device 5 can be easily and securely mounted on the supporting base 4 as shown in FIG. 4, allowing a user to view the contents displayed by, and/or operate, the mobile electronic device 5 in different environments with the same ease and steadiness.

While the conventional clamp-type mount 2 in FIG. 2 to FIG. 4 effectively solves the three problems stated above of the conventional clamping and hanging mount 1 and of the conventional suction- or adhesive-based mounts, making it possible to use the mobile electronic device 5 in FIG. 4 in a variety of environments, the inventor of the present invention found the following two annoying drawbacks of the conventional clamp-type mount 2 after using it personally:

(2-1) Applicable only to fixing members of a narrow range of sizes: The size range of fixing members to which the conventional clamp-type mount 2 can be clamped is limited by the curved shapes of the first and the second clamping members 20, 21, the length of the tightening threaded rod 24 between the clamping members 20, 21, and the way the first end of the tightening threaded rod 24 is fixedly connected to the tightening knob 27. Therefore, unless substantially increased in size, the conventional clamp-type mount 2 can be securely clamped only to relatively small fixing members but not larger ones (e fixing rods with relatively large diameters; and relatively thick fixing plates, projections, or edges). However, increasing the size of the conventional clamp-type mount 2 not only goes totally against the design trend of mobile electronic device peripherals toward compactness and light weight, but also comprises portability and the convenience of use, simply considering the larger space occupied by the mount.

(2-2) Unreliable after prolonged use in a harsh environment: As stated above, it is common practice to enhance the clamping ability of the clamping members 20, 21 by attaching the anti-slip elements 201, 211 (each of which is a layer of elastic plastic material) adhesively to the surfaces of the clamping grooves 200, 210 in the corresponding inner sides of the clamping members 20, 21. The anti-slip elements 201, 211 are intended to increase friction between the clamping members 20, 21 and the fixing member so that the conventional clamp-type mount 2 can be securely positioned on the fixing member, without the clamping members 20, 21 gliding on or coming off the fixing member. However, things do not always go as planned. When the conventional clamp-type mount 2 is persistently used in a harsh environment (e.g., of high temperature, high humidity, and high salinity), such severe conditions as high temperature, high humidity, and high salinity tend to cause deterioration, gelatinization, hardening, or even detachment of the anti-slip elements 201, 211 and the adhesive applied thereto, resulting in a loss of the intended anti-slip function. In other words, the clamping members 20, 21 are still very likely to slide on or come off the fixing member after long-term use, making it impossible for a user to view the contents displayed by, and/or operate, the mobile electronic device 5 steadily, if the user can do so at all.

It is therefore an important issue for mount designers and manufacturers to overcome the two drawbacks of the conventional clamp-type mount 2 so that an improved clamp-type mount having the same size as the conventional clamp-type mount 2 can be clamped to and positioned on fixing members of a wider range of sizes; that the improved clamp-type mount is insusceptible to high temperature, high humidity, or high salinity and hence can be used continually in a harsh environment without the anti-slip elements deteriorating or peeling off; and that the improved clamp-type mount can be securely positioned on a fixing member without sliding or coming off and thereby allow a user to steadily view the contents displayed by, and/or operate, the mobile electronic device 5 supported on the improved clamp-type mount. The above issue is also the one intended to be addressed by the present invention.

BRIEF SUMMARY OF THE INVENTION

In view of, and to overcome, the aforesaid design drawbacks of the conventional mounts, the inventor of the present invention incorporated years of practical experience in the related industry into careful observation and research and, after repeated adjustment and performance assessment, finally succeeded in developing a clamp-type mount that can be clamped to objects of a wide range of sizes.

The present invention provides a clamp-type mount capable of being clamped to objects of a wide range of sizes. The clamp-type mount is applicable to a mobile electronic device so that the mobile electronic device can be securely positioned on a fixing member through the mount. The clamp-type mount includes a first clamping member, a second clamping member, a clamping-member pivot shaft, a tightening pivot shaft, a tightening threaded rod, a tightening knob, and a spherical coupling head. The inner side of the first clamping member is concavely provided with a curved clamping groove. Also, the first clamping member is formed with an enclosed passage hole. The inner side of the second clamping member is concavely provided with a curved clamping groove corresponding to the clamping groove concavely provided in the inner side of the first clamping member. The clamping-member pivot shaft is pivotally provided in the first and the second clamping members at a position adjacent to one end (hereinafter the first end) of each clamping member. Each of the first and the second clamping members, therefore, can be rotated about the clamping-member pivot shaft to bring the free end (i.e., the other end, hereinafter the second end) of the first clamping member and the free end (i.e., the other end, hereinafter the second end) of the second clamping member either close to each other into a "clamping state" or away from each other into a "releasing state". The location and size of the enclosed passage hole are such that, when the second clamping member is rotated about the clamping-member pivot shaft toward the first clamping member, the free end of the second clamping member can extend through the enclosed passage hole and consequently be exposed on the outer side of the first clamping member. The tightening pivot shaft is transversely and pivotally connected to the second clamping member at a position adjacent to a middle section of the second clamping member. The tightening pivot shaft has a middle section formed with a fixing hole, and the fixing hole extends along a diameter of, and thus penetrates, the tightening pivot shaft. One end (hereinafter the first end) of the tightening threaded rod extends through the first clamping member and is exposed on the outer side of the first clamping member. The other end of the tightening threaded rod is fixedly connected to the fixing hole. The tightening knob is threadedly connected to the first end of the tightening threaded rod so as to be displaced along an axial direction of the tightening threaded rod when rotated. Once the bottom end of the tightening knob is pressed against the outer side of the first clamping member, the tightening knob applies a tightening force through the tightening threaded rod to the tightening pivot shaft and then to the second clamping member, thereby driving the second clamping member toward the first clamping member, in order for the free ends, or the surfaces of the clamping grooves, of the first and the second clamping members to clamp the fixing member tightly between them. The spherical coupling head is fixedly provided on the outer side of the first clamping member at a position adjacent to the first end of the first clamping member and is configured to couple with an adapter for linking a supporting base to the spherical coupling head. This clamp-type mount can be easily and securely positioned on various fixing members (e.g., motorcycle or bicycle handlebars that vary in thickness, handrails or railings that are installed in cargo compartments or ship cabins and vary in thickness, and work platforms and edges thereof that vary in thickness), allowing easy and arbitrary adjustment of the position and angle of the mobile electronic device as needed, so that a user can steadily view the contents displayed by, and/or operate, the mobile electronic device in various environments both easily and comfortably.

One objective of the present invention is to free the foregoing clamp-type mount from restrictions of the length of the tightening threaded rod and hindrance of the tightening knob so that, by rotating the first and the second clamping members about the clamping-member pivot shaft, the free ends (i.e., the second ends) of the first and the second clamping members can be moved away from each other to form the maximum clamping space between the free ends of the first and the second clamping members. The present invention is so designed that the second end of the tightening threaded rod is fixedly connected to the fixing hole while the tightening knob is threadedly connected to the first end of the tightening threaded rod. This allows the tightening knob to be displaced along an axial direction of the tightening threaded rod when rotated. As previously mentioned, once the bottom end of the tightening knob is pressed against the outer side of the first clamping member, the tightening knob applies a tightening force through the tightening threaded rod to the tightening pivot shaft and then to the second clamping member, thereby driving the second clamping member toward the first clamping member, in order for the free ends, or the surfaces of the clamping grooves, of the first and the second clamping members to clamp the fixing member tightly between them. Conversely, by rotating the tightening knob in the opposite direction, the tightening knob can be detached from the first end of the tightening threaded rod; as a result, the first and the second clamping members are no longer restricted by the length of the tightening threaded rod or the tightening knob and can each be rotated to the greatest extent possible about the clamping-member pivot shaft, thereby moving the free ends (i.e., the second ends) of the first and the second clamping members away from each other to form the maximum clamping space between the free ends. The clamp-type mount, therefore, can be easily and securely positioned on fixing members of various sizes motorcycle or bicycle handlebars that vary in thickness, handrails or railings that are installed in cargo compartments or ship cabins and vary in thickness, and work platforms and edges thereof that vary in thickness), allowing a user to steadily view the contents displayed by, and/or operate, the mobile electronic device in various environments both easily and comfortably.

Another objective of the present invention is to position and size the enclosed passage hole of the first clamping member in such a way that, when the second clamping member is rotated about the clamping-member pivot shaft toward the first clamping member, the free end (i.e., the second end) of the second clamping member can extend through the enclosed passage hole and be exposed on the outer side of the first clamping member to render the clamp-type mount into the minimum height, thereby substantially reducing the space occupied by the clamp-type mount to facilitate storage and carrying.

BRIEF DESCRIPTION OF THE SEVERAL VIEWS OF THE DRAWINGS

The structural features, assembly method, effects, and objectives of the present invention can be better understood by referring to the following detailed description of some illustrative embodiments in conjunction with the accompanying drawings, in which.

DETAILED DESCRIPTION OF THE INVENTION

Figure 1:
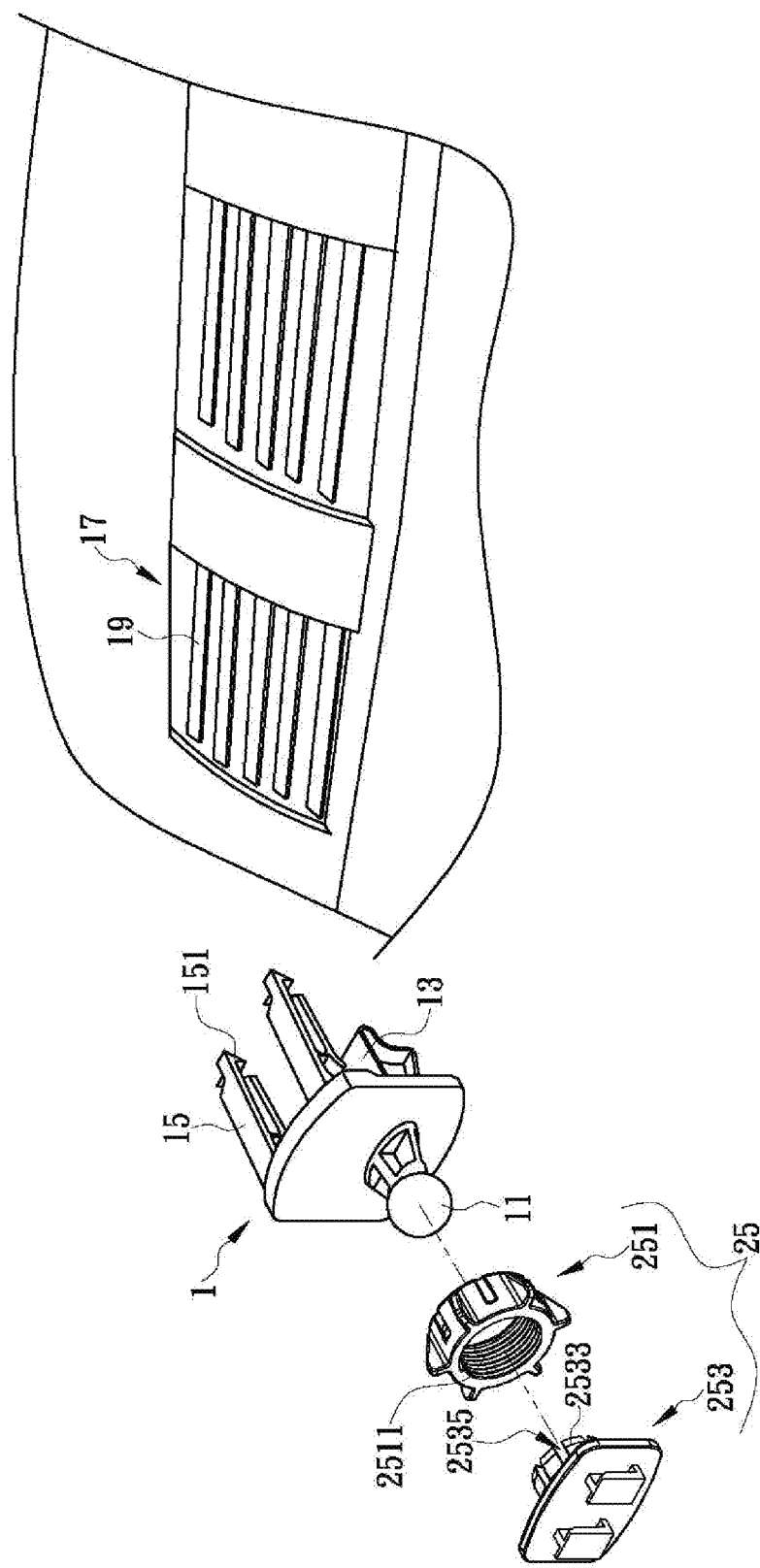
FIG. 1 is an exploded perspective view of a conventional clamping and hanging mount.
Figure 2:
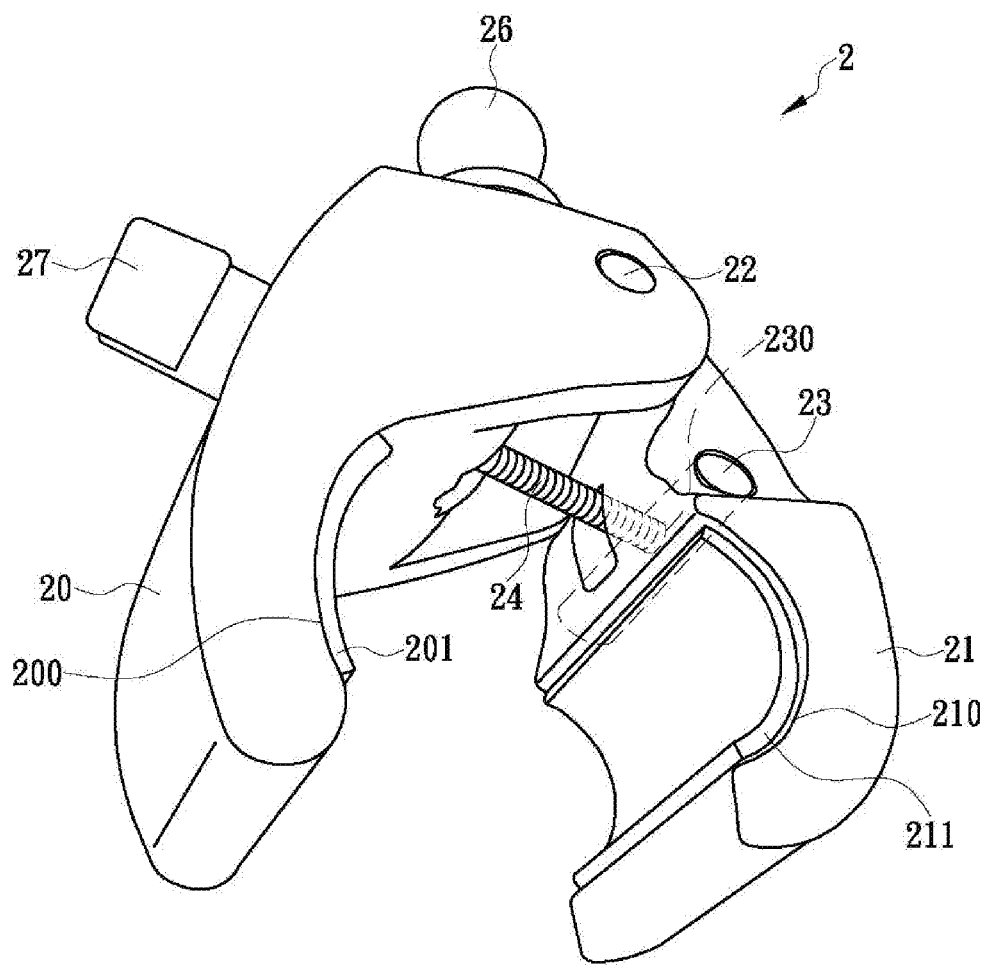
FIG. 2 is a perspective view of a conventional clamp-type mount.
Figure 3:
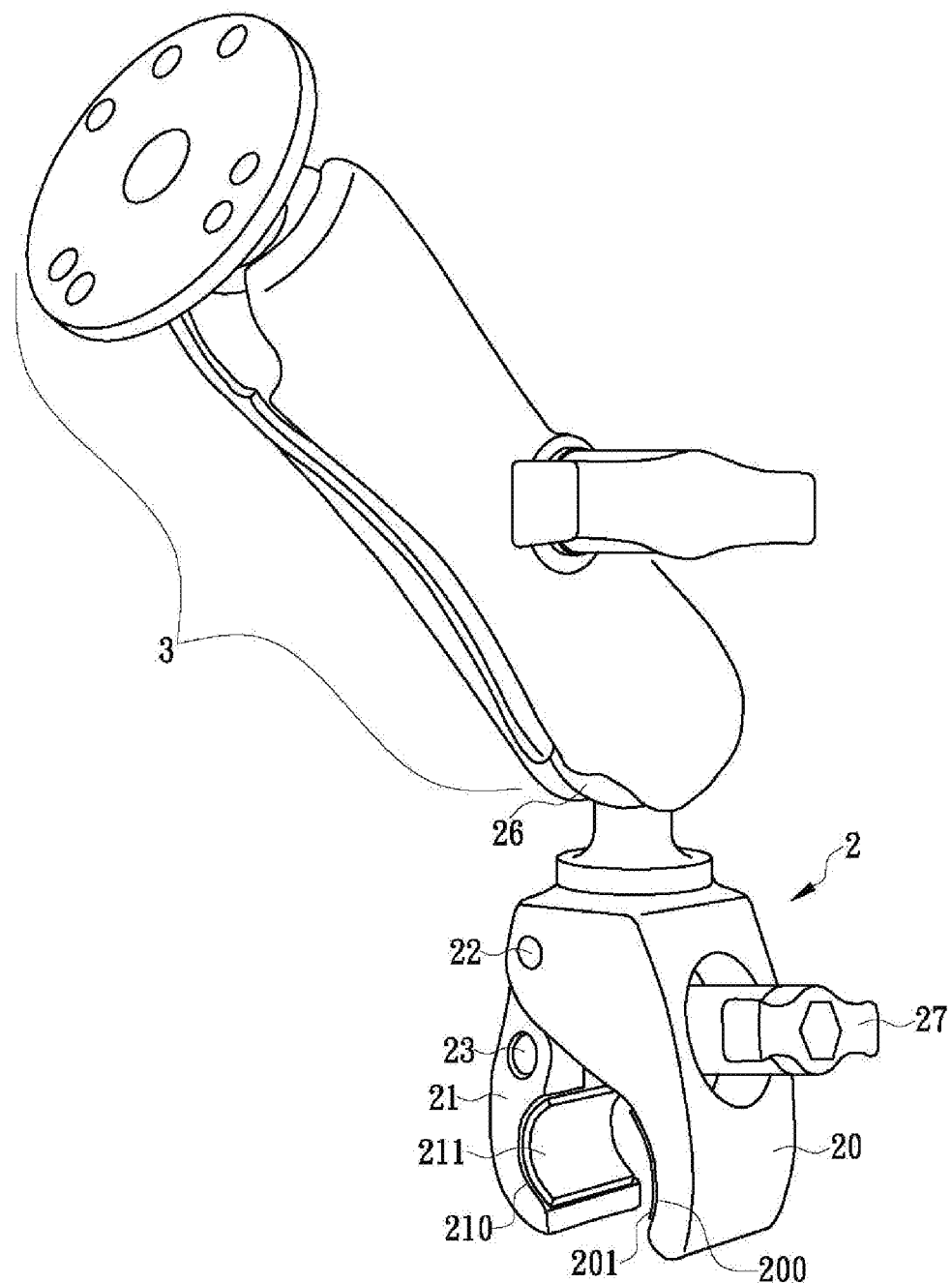
FIG. 3 is a perspective view of the conventional clamp-type mount in FIG. 2 mounted with an adapter.
Figure 4:
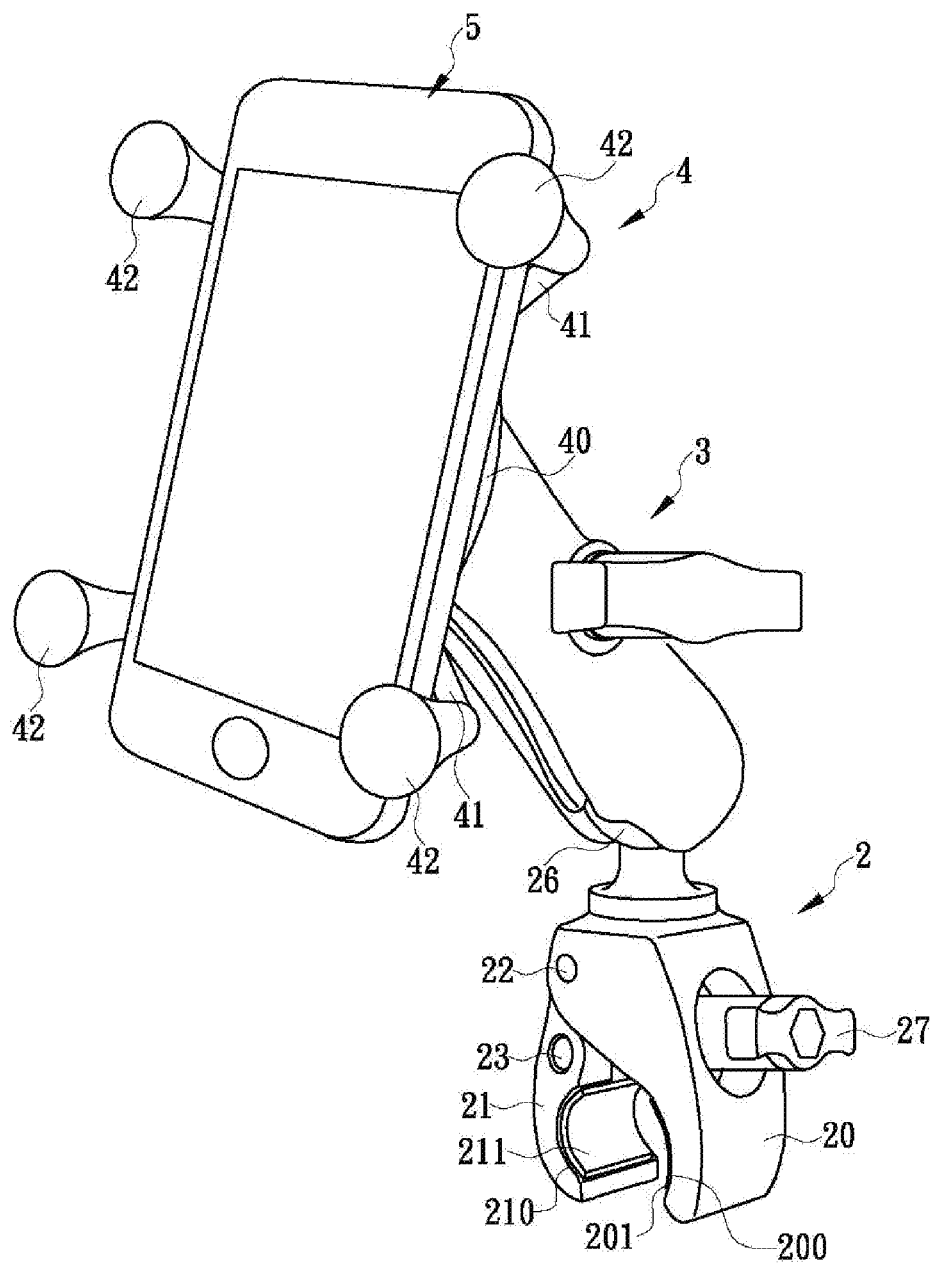
FIG. 4 is a perspective view of the conventional clamp-type mount in FIG. 2 mounted with an adapter, a supporting base, and a mobile electronic device.
Figure 5:
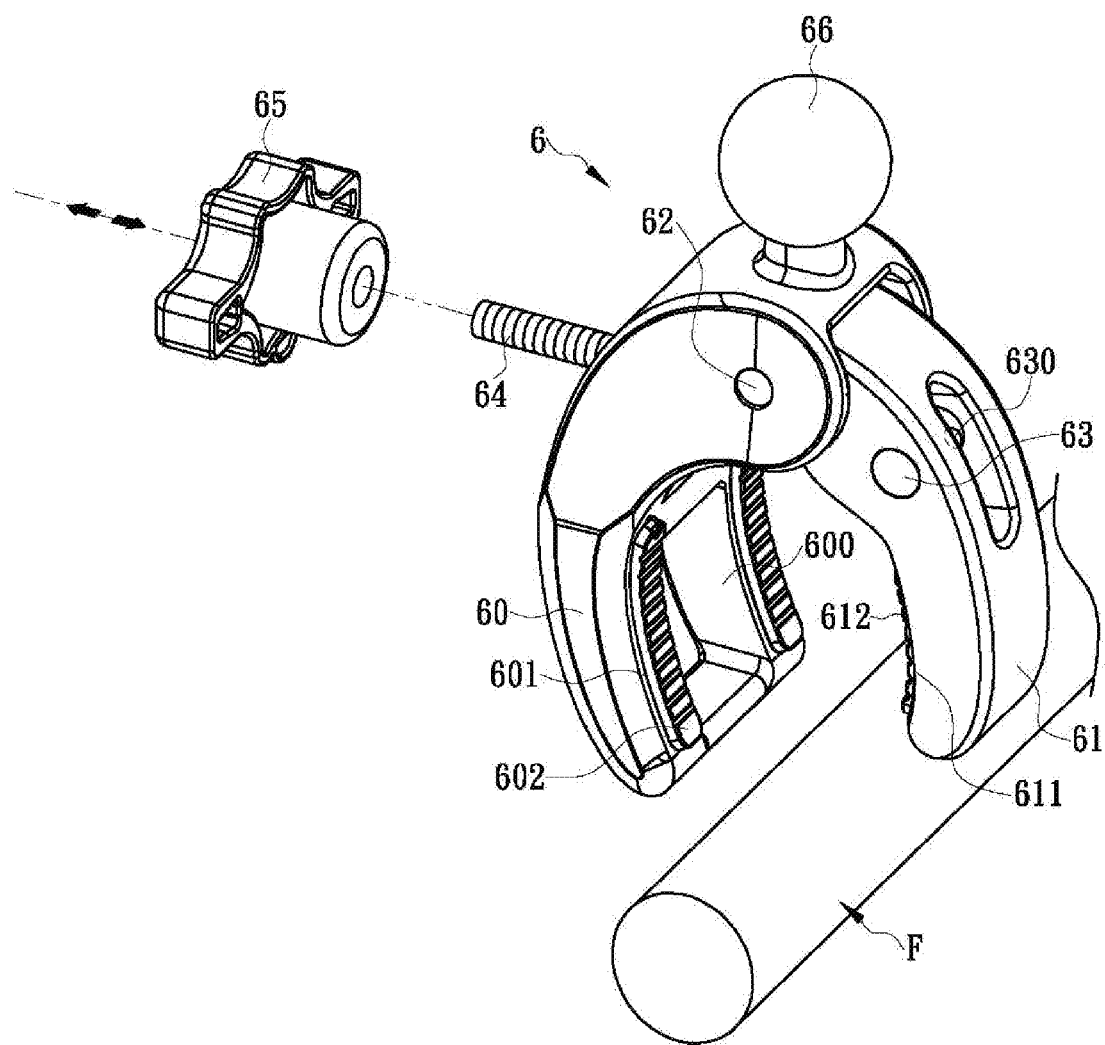
FIG. 5 is an exploded perspective view of a clamp-type mount according to the present invention.

Referring to FIG. 5, the present invention provides a clamp-type mount 6 that can be clamped to objects of a wide range of sizes. The clamp-type mount 6 is designed for use with a mobile electronic device 9 (e.g., a smartphone, not shown in FIG. 5) so that the mobile electronic device 9 not only can be easily and securely positioned on various fixing members F (e.g., motorcycle or bicycle handlebars that vary in thickness, handrails or railings that are installed in cargo compartments or ship cabins and vary in thickness, and work platforms and edges thereof that vary in thickness) through the clamp-type mount 6, but also can be easily and arbitrarily adjusted to a proper position and angle as needed, in order for the user to view the contents displayed by, and/or operate, the mobile electronic device 9 in a steady and comfortable manner.

Figure 6:
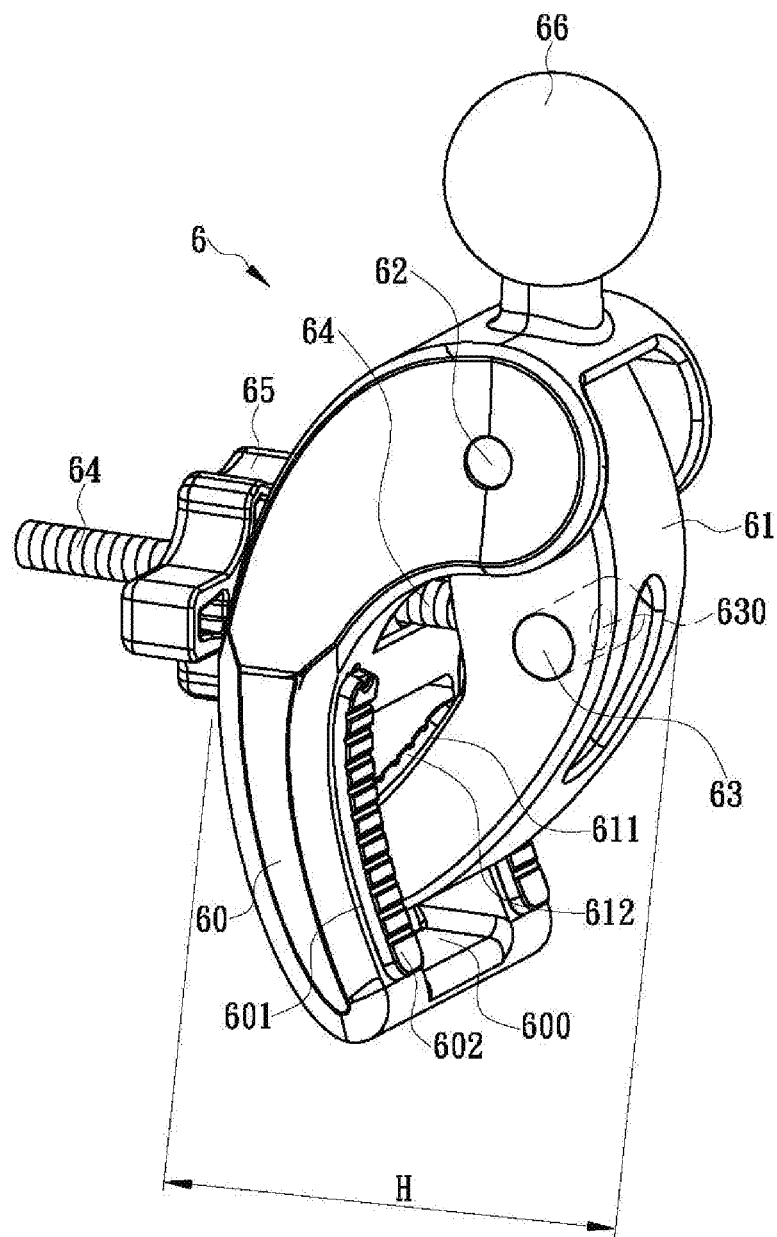
FIG. 6 shows a state of use of the clamp-type mount in FIG. 5.

As shown in FIG. 5, the clamp-type mount 6 includes a first clamping member 60, a second clamping member 61, a clamping-member pivot shaft 62, a tightening pivot shaft 63, a tightening threaded rod 64, a tightening knob 65, and a spherical coupling head 66. Each of the first clamping member 60, the second clamping member 61, and the spherical coupling head 66 is integrally formed of a first plastic material by injection molding. The first clamping member 60 and the second clamping member 61 are pivotally connected via the clamping-member pivot shaft 62 at a position adjacent to one end (hereinafter the first end) of each clamping member. Each of the first clamping member 60 and the second clamping member 61, therefore, can be rotated about the clamping-member pivot shaft 62 to bring the free ends (i.e., the opposite second ends) of the first and the second clamping members 60, 61 either close to each other into a "clamping state" or away from each other into a "releasing state". The first clamping member 60 is formed with an enclosed passage hole 600. As shown in FIG. 6, the location and size of the enclosed passage hole 600 are so designed that, when the second clamping member 61 is rotated about the clamping-member pivot shaft 62 toward the first clamping member 60, the free end (i.e., the second end) of the second clamping member 61 can extend through the enclosed passage hole 600 and end up exposed on the outer side of the first clamping member 60. As shown in FIG. 5 and FIG. 6, the corresponding inner sides of the first and the second clamping members 60, 61 are concavely provided with curved clamping grooves 601, 611 respectively. In the "clamping state", the free ends (i.e., the second ends) of the first and the second clamping members 60, 61 or the surfaces of the clamping grooves 601, 611 of the clamping members 60, 61 lie against a fixing member F (e.g., a fixing rod, a fixing plate, or a fixed projection or edge) in a clamping manner such that the clamp-type mount 6 is securely positioned on the fixing member F.

With continued reference to FIG. 5 and FIG. 6, the surface of each of the clamping grooves 601, 611 is provided with an anti-slip element 602, 612 to enhance the clamping ability of the clamping members 60, 61 and prevent the clamping members 60, 61 from sliding on the fixing member F or coming off the fixing member F. The anti-slip elements 602, 612 are made of a second plastic material, which has a lower hardness than the first plastic material. Moreover, the anti-slip elements 602, 612 are respectively formed on the surfaces of the clamping grooves 601, 611 by secondary injection molding or high-frequency welding and are thus joined to the first plastic material. This ensures that the anti-slip elements 602, 612 will not peel off or come off the surfaces of the clamping grooves 601, 611 after prolonged exposure to a high-temperature, high-humidity, or high-salinity environment. The tightening pivot shaft 63 is transversely and pivotally, connected to the second clamping member 61 at a position adjacent to a middle section of the second clamping member 61. A fixing hole 630 is formed in a middle section of the tightening pivot shaft 63 and extends through the tightening pivot shall 63 along a diameter thereof. The tightening threaded rod 64 has one end (hereinafter the first end) extending through the first clamping member 6C) and exposed on the outer side of the first clamping member 60. The opposite end (hereinafter the second end) of the tightening threaded rod 64 is fixedly connected to the fixing hole 630. The tightening knob 65 is threadedly connected to the first end of the tightening threaded rod 64 and can therefore be displaced along an axial direction of the tightening threaded rod 64 (as indicated by either of the opposite arrows in FIG. 5) when rotated, Once the bottom end of the tightening knob 65 is pressed against the outer side of the first clamping member 60, the tightening knob 65 applies a tightening force through the tightening threaded rod 64 to the tightening pivot shaft 63 and consequently to the second clamping member 61, thereby driving the second clamping member 61 toward the first clamping member 60. As the rotation, and hence displacement, of the tightening knob 65 continues, the tightening force will keep driving the second clamping member 61 until the fixing member F is tightly clamped between the free ends of the first and the second clamping members 60, 61 or between the surfaces of the clamping grooves 601, 611 of the clamping members 60, 61 as a result, the clamp-type mount 6 is firmly positioned on the fixing member F. Thus, referring again to FIG. 5 and FIG. 6, the clamp-type mount 6 can be easily and securely positioned on various fixing members F, such as motorcycle or bicycle handlebars that vary in thickness, handrails or railings that are installed in cargo compartments or ship cabins and vary in thickness, and work platforms and edges thereof that vary in thickness.

Figure 8:
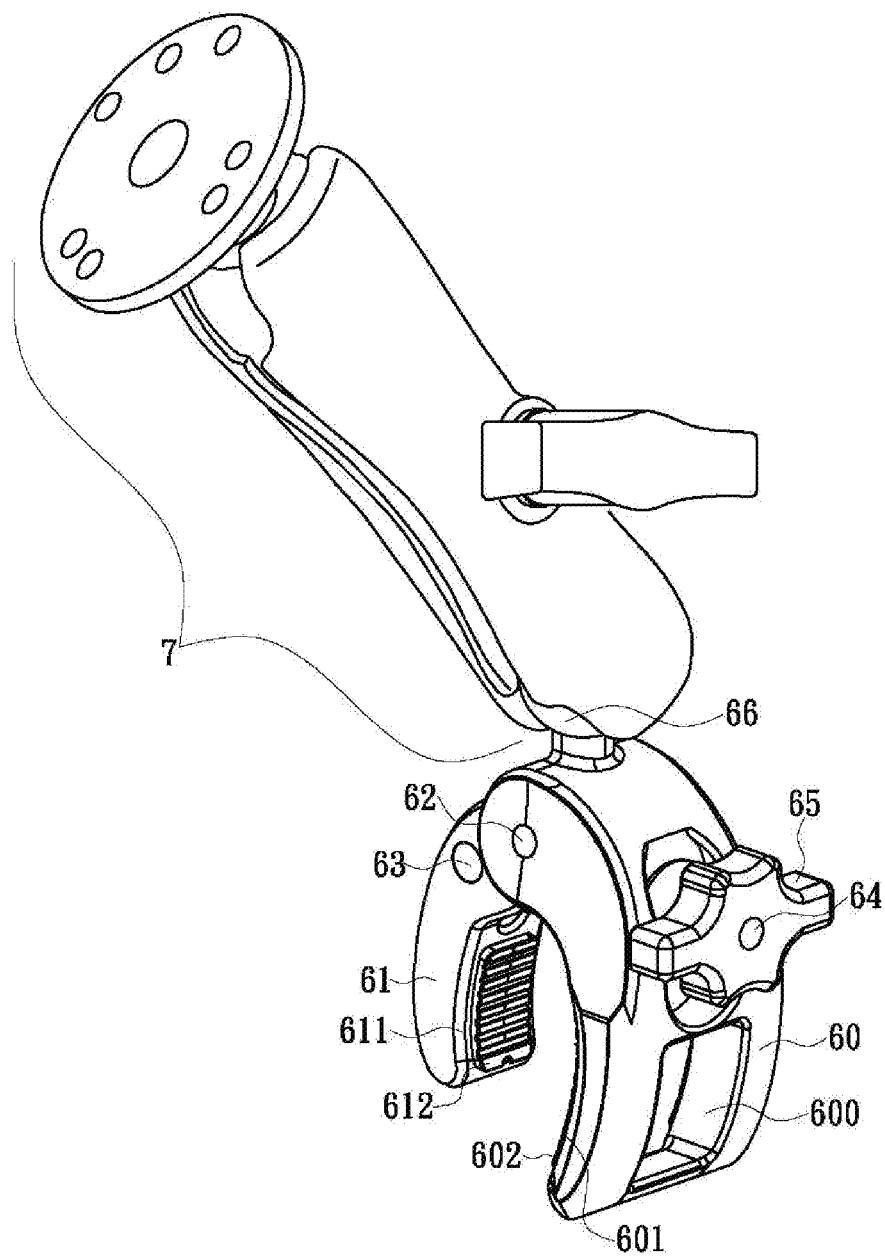
FIG. 8 is a perspective view of the clamp-type mount in FIG. 5 mounted with a conventional adapter.
Figure 9:
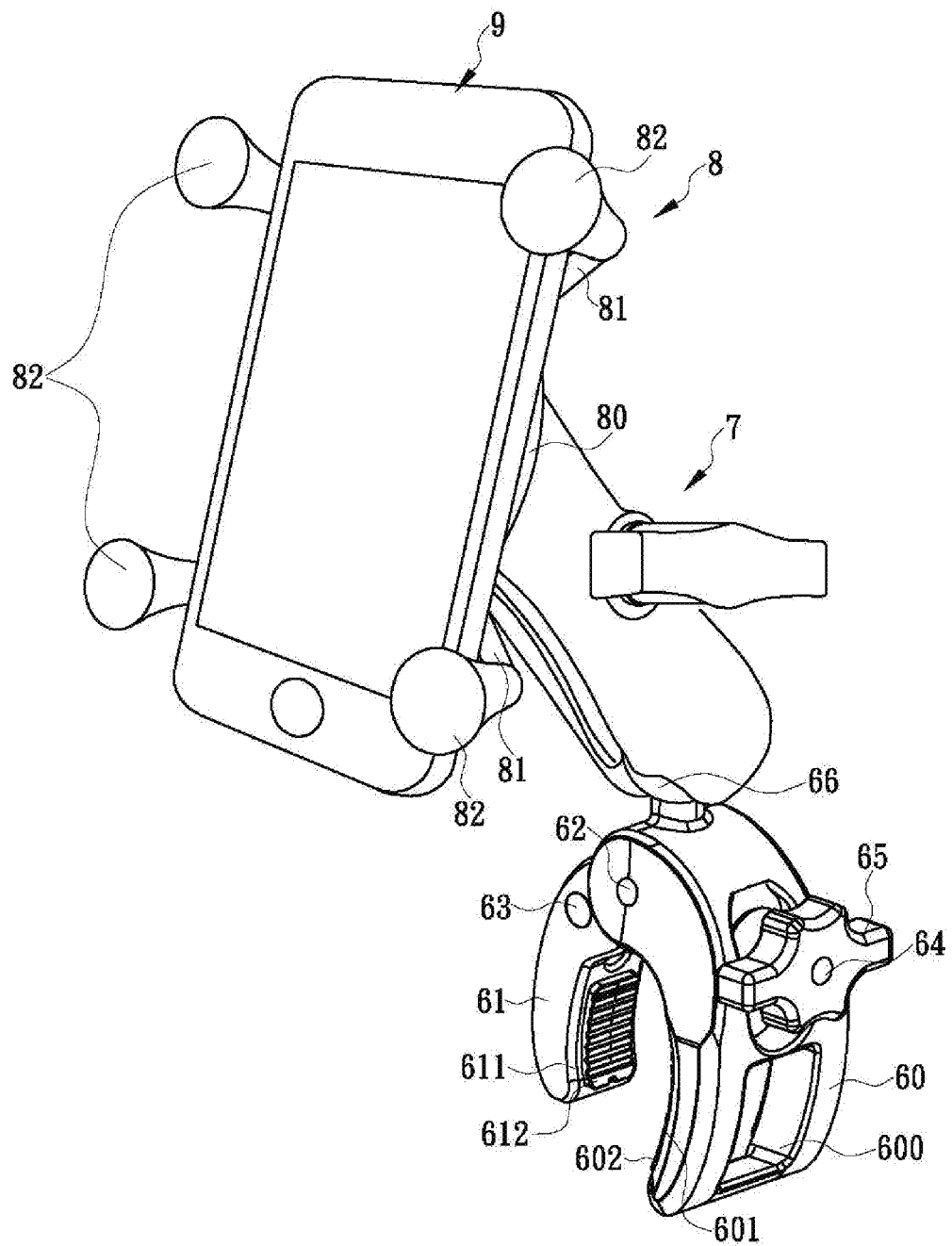
FIG. 9 is a perspective view of the clamp-type mount in FIG. 5 mounted with a conventional adapter, a conventional supporting base, and a mobile electronic device.

Referring now to FIG. 8 and FIG. 9, a supporting base 8 can be linked to the spherical coupling head 66 (which is fixedly provided on the outer side of the first clamping member 60 at a position adjacent to the first end of the first clamping member 60) via an adapter 7, and then a mobile electronic device 9 can be easily and securely mounted on the supporting base 8 as shown in FIG. 9 so that the user can view the contents displayed by, and/or operate, the mobile electronic device 9 in different environments with the same ease and steadiness.

Figure 7:
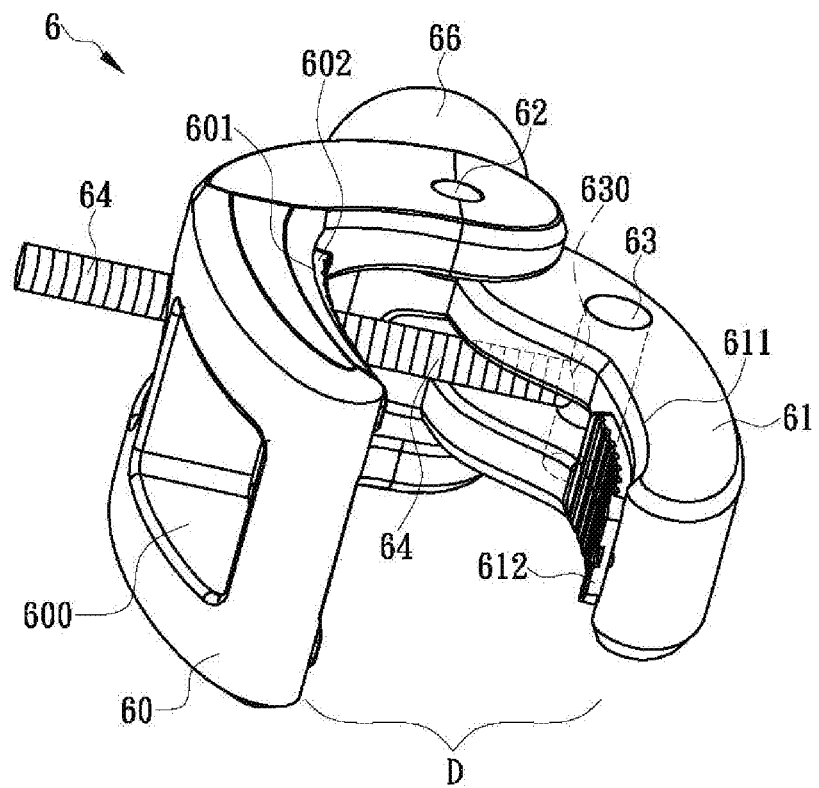
FIG. 7 shows another state of use of the clamp-type mount in FIG. 5.

It should be pointed out that, referring to FIG. 7, the present invention can free the clamp-type mount 6 from restrictions imposed by the length of the tightening threaded rod 64 and from hindrance of the tightening knob 65 so that the first and the second clamping members 60, 61 can be rotated about the clamping-member pivot shaft 62 and move their respective free ends (i.e., second ends) away from each other to form the maximum clamping space D (see FIG. 7) between the free ends of the first and the second clamping members 60, 61, To this end, the present invention is so designed that the second end of the tightening threaded rod 64 is fixedly connected to the fixing hole 630 and that the tightening knob 65 is threadedly connected to the first end of the tightening threaded rod 64. This design not only allows the tightening knob 65 to be displaced along an axial direction of the tightening threaded rod 64 (as indicated by either of the opposite arrows in FIG. 5) when rotated and apply a tightening force through the tightening threaded rod 64 sequentially to the tightening pivot shaft 63 and the second clamping member 61 when the bottom end of the tightening knob 65 is pressed against the outer side of the first clamping member 60, thereby moving the second clamping member 61 toward the first clamping member 60 to clamp the fixing member F tightly with the free ends (or the surfaces of the clamping grooves 601, 611) of the first and the second clamping members 60, 61, but also allows the tightening knob 65 to be detached from the first end of the tightening threaded rod 64 (see FIG. 6) by rotation in the opposite direction such that the first and the second clamping members 60, 61 are no longer restricted by the length of the tightening threaded rod 64 or the tightening knob 65 and can therefore be rotated to the greatest extent possible about the clamping-member pivot shaft 62 and thereby move their respective free ends (i.e., second ends) away from each other to form the maximum clamping space D between the free ends as shown in FIG. 7, enabling the clamp-type mount 6 to be applied to a variety of mobile electronic devices. That is to say, the clamp-type mount 6 of the present invention makes it possible to easily and securely position a mobile electronic device on differently sized fixing members, such as motorcycle or bicycle handlebars that vary in thickness, handrails or railings that are installed in cargo compartments or ship cabins and vary in thickness, and work platforms and edges thereof that vary in thickness. In addition, referring back to FIG. 6, the enclosed passage hole 600 in the first clamping member 60 of the present invention is so located and sized that, when the second clamping member 61 is rotated about the clamping-member pivot shaft 62 toward the first clamping member 60, the free end (i.e., the second end) of the second clamping member 61 can pass through the enclosed passage hole 600 and be exposed on the outer side of the first clamping member 60 to render the clamp-type mount 6 into the minimum height H, thus substantially reducing the space occupied by the clamp-type mount 6, allowing the clamp-type mount 6 to be stored and carried with ease.

In the preferred embodiment described above, the first plastic material may be fiber-reinforced plastic, and the second plastic material may be silicone-based to ensure that the clamp-type mount 6 has the required structural strength and that the anti-slip elements 602, 612 will not deteriorate, peel off, or detach from the surfaces of the clamping grooves 601, 611 and consequently lose their intended anti-slip function after prolonged use in a high-temperature, high-humidity, or high-salinity environment.

While the invention herein disclosed has been described by means of specific embodiments, numerous modifications and variations could be made thereto by those skilled in the art without departing from the scope of the invention set forth in the claims.

What is claimed is:

1. A clamp-type mount capable of being clamped to objects of a wide range of sizes, wherein the clamp-type mount is applicable to a mobile electronic device so that the mobile electronic device can be securely positioned on a fixing member through the clamp-type mount, the clamp-type mount comprising:
   a first clamping member having an inner side concavely provided with a curved clamping groove; wherein the first clamping member is formed with an enclosed passage hole;
   a second clamping member having an inner side concavely provided with a curved clamping groove corresponding to the clamping groove concavely provided in the inner side of the first clamping member;
   a clamping-member pivot shaft for pivotally connecting the first clamping member and the second clamping member at a position adjacent to a first end of the first clamping member and a first end of the second clamping member such that each of the first clamping member and the second clamping member is rotatable about the clamping-member pivot shaft to bring a free end of the first clamping member and a free end of the second clamping member either close to each other into a clamping state or away from each other into a releasing state, wherein when the second clamping member is rotated about the clamping-member pivot shaft toward the first clamping member, the free end of the second clamping member is able to extend through the enclosed passage hole and be exposed on an outer side of the first clamping member to render the clamp-type mount into a minimum height;
   a tightening pivot shaft transversely and pivotally connected to the second clamping member at a position adjacent to a middle section of the second clamping member, wherein the tightening pivot shaft has a middle section formed with a fixing hole, and the fixing hole extends along a diameter of, and thus penetrates, the tightening pivot shaft;
   a tightening threaded rod having a first end extending through, and exposed on the outer side of, the first clamping member and an opposite second end fixedly connected to the fixing hole;
   a tightening knob threadedly connected to the first end of the tightening threaded rod so as to be displaced along an axial direction of the tightening threaded rod when rotated, wherein when a bottom end of the tightening knob is pressed against the outer side of the first clamping member, the tightening knob applies a tightening force through the tightening threaded rod to the tightening pivot shaft and the second clamping member sequentially, thereby driving the second clamping member toward the first clamping member, in order for either the free end of the first clamping member and the free end of the second clamping member or a surface of the clamping groove of the first clamping member and a surface of the clamping groove of the second clamping member to clamp the fixing member tightly therebetween and thus position the clamp-type mount securely on the fixing member; and
   a spherical coupling head fixedly provided on the outer side of the first clamping member at a position adjacent to the first end of the first clamping member, wherein the spherical coupling head is configured to couple with an adapter in order for the adapter to link a supporting base to the spherical coupling head, and the mobile electronic device is mounted on the supporting base.

2. The clamp-type mount of claim 1, wherein each of the first clamping member, the second clamping member, and the spherical coupling head is made of a first plastic material, the surface of each said clamping groove is provided with an anti-slip element made of a second plastic material, and the second plastic material has a lower hardness than the first plastic material.

3. The clamp-type mount of claim 2, wherein the second plastic material is formed on the surface of each said clamping groove by secondary injection molding or high-frequency welding and is joined to the first plastic material.

4. The clamp-type mount of claim 3, wherein the first plastic material is fiber-reinforced plastic.

5. The clamp-type mount of claim 4, wherein the second plastic material is silicone.

* * * * *